Dec. 4, 1962 H. E. EDEN 3,066,601

ERROR CHECKING DEVICES

Filed Dec. 29, 1959 4 Sheets-Sheet 1

INVENTOR
HAROLD E. EDEN

BY Francis V. Giolma

ATTORNEY

Dec. 4, 1962 H. E. EDEN 3,066,601

ERROR CHECKING DEVICES

Filed Dec. 29, 1959 4 Sheets-Sheet 2

Dec. 4, 1962 H. E. EDEN 3,066,601

ERROR CHECKING DEVICES

Filed Dec. 29, 1959 4 Sheets-Sheet 3

United States Patent Office 3,066,601

Patented Dec. 4, 1962

3,066,601

ERROR CHECKING DEVICES

Harold E. Eden, White Plains, N.Y., assignor to International Business Machines Corporation, New York, N.Y., a corporation of New York Filed Dec. 29, 1959, Ser. No. 862,534

7 Claims. (Cl. 101—93)

This invention relates generally to error checking devices, and it has reference in particular to circuits utilizing magnetic core error checking devices.

Generally stated, an object of this invention is to provide for using magnetic core storage devices for checking the operation of printing apparatus or the like.

More specifically, it is an object of this invention to provide for using a multiposition magnetic core storage device for storing an indication of a character for each of a plurality of print positions and for resetting the core in each storage position as a character is printed so that a sample at the end of a print line results in a zero output for a valid condition.

Another object of this invention is to provide for storing information to be printed in a plurality of positions and for continuously advancing a counter to indicate a character on a moving character bearing element opposite an eligible print position and for comparing with the stored information for the particular print position, and for serially firing print hammers and setting a core in an equal check plane for each print position in which coincidence is achieved.

It is an important object of this invention to provide in a printer for using a core matrix to store an indication of coincidence between data in a memory storage position and an indication by a compare counter of a character on a moving chain and for comparing the condition of a position in the matrix with the corresponding position in a hammer fire core plane which is responsive to the firing of a print hammer for a particular position.

It is also an object of this invention to provide for setting cores in one core plane to one condition in response to a signal to fire a particular print hammer and to set cores in another plane to an oposite condition when the hammer is fired, and to set a core in an error plane whenever an equal condition exists between corresponding cores in the two planes.

A further object of this invention is to provide for using a pair of print drive control rings for simultaneously operating switches to select eligible core positions in a storage matrix and for selecting eligible print hammers in a hammer drive matrix comparing the character in storage with that at each print position, and for triggering the selected hammer drivers if a comparison exists.

Yet another object of this invention is to provide for controlling a print hammer firing circuit in response to coincidence between a character counter and a character in memory storage, and for setting a core in a hammer fire check plane when the hammer is fired.

It is also an object of this invention to provide in a chain printer for using a character counter operated by means of a timing drum for producing timed pulses for determining when coincidence exists between a character in storage for a particular position and a character on the chain which is oposite such position, and for simultaneously firing the hammer for that position and setting a core in an equal check plane.

The foregoing and other objects, features and advantages of the invention will be apparent from the following more particular description of a preferred embodiment of the invention, as illustrated in the accompanying drawings.

Figure 1:
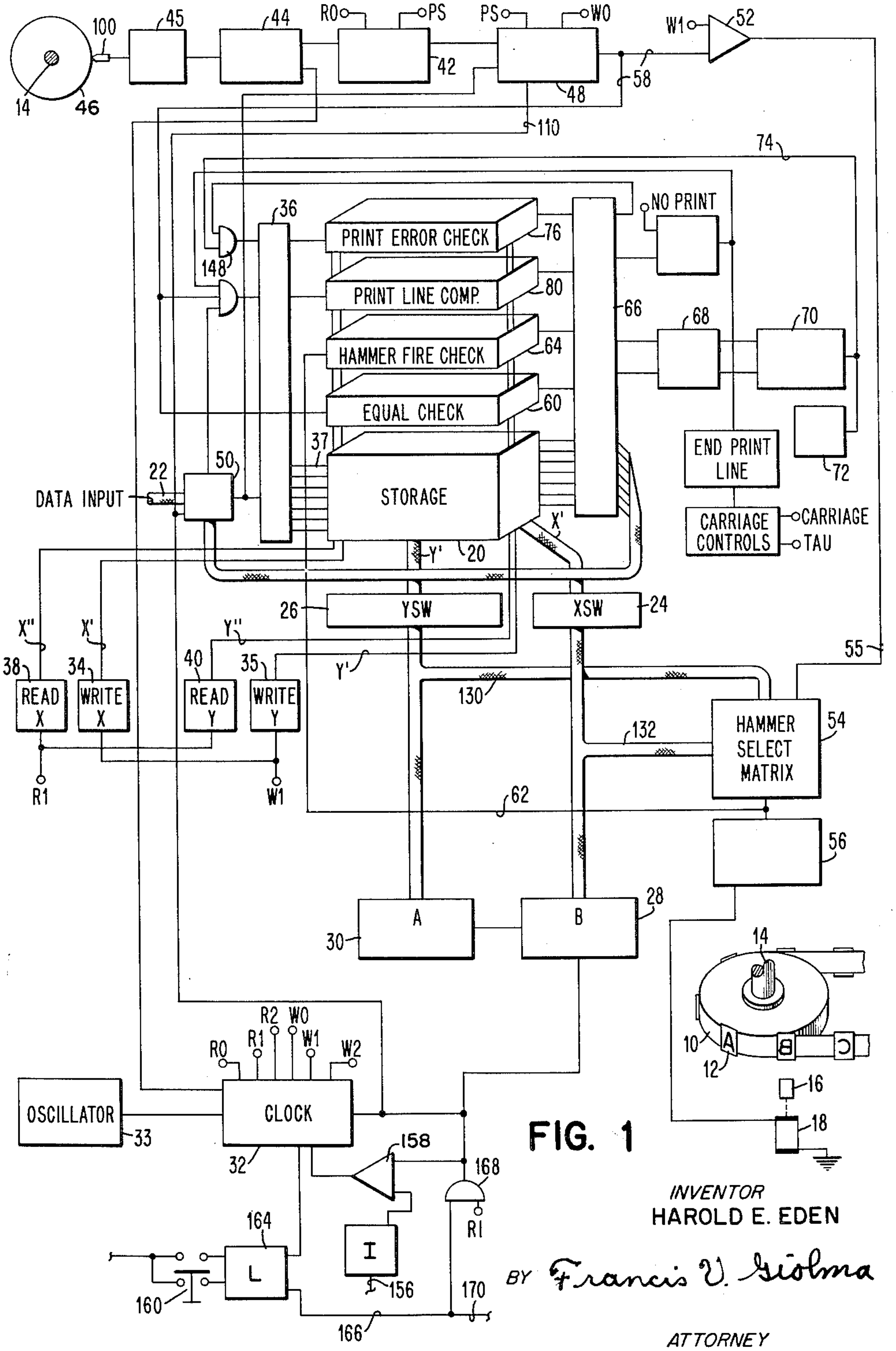
FIG. 1 is a block diagram illustrating the application of check circuits to a chain printer in accordance with one embodiment of the invention.

In each of the drawings of the various control circuits, the individual components or units making up the circuit are generally indicated merely as a box or the like. The specific circuitry of such boxes will not be generally described as applied to any specific form of tube or diode circuit. A detailed description of typical diode coincidence switches, diode mixers, inverters, single and double latches along with cathode followers, power tubes and the like, where required, is shown and described in the application of F. E. Hamilton et al., Serial No. 544,520, filed November 5, 1955, and assigned to the assignee of the present invention, and which issued as Patent No. 2,959,351 on November 8, 1960.

For the purpose of this description, a typical coincidence switch shown as a triangle and otherwise known as a logical AND circuit or diode switch comprises usually diodes or the like, not shown, each including an individual input terminal normally biased negative so that the common terminal is at a negative potential with respect to ground. If coincident positive pulses are applied to all input intervals, the potential of the output terminal is raised. However, if only one of the input terminals or less than all of the input terminals is pulsed positively, the potential of the common output terminals is not raised appreciably. Any suitable voltage responsive device may be controlled by the potential of the output terminal to furnish a usuable output voltage level whenever a coincidence of positive input pulses is detected.

A typical mixer, otherwise known as a logical OR circuit or diode mix, may also comprise diodes, tubes or the like. In the present drawings to distinguish diode mixes from diode switches, the former are shown as the arc of a circle. Any suitable voltage responsive device may be controlled by the potential of the common output terminal of the diode mix. This terminal is connected by a suitable resistor to a negative voltage source, not shown, and maintains a negative bias on the related diode or tube. Each diode is connected to an individual input terminal which in turn is connected in the electrical circuit. If either or all of the diode input terminals are raised, the potential of the output terminal is raised, which permits the tube or the like associated therewith to conduct or operate in a predetermined manner.

While cathode followers, inverters, or the like are not always shown in detail, it is to be understood that various types may be utilized in different locations, and the circuits may involve various resistance values and capacity couplings to produce the desired outputs. Since the particular cathode followers and inverters are not a part of the present invention, a detailed description of each type is not deemed necessary. Likewise in the drawings, all power tubes, inverters, double inverters, and the like which would normally be required to maintain the proper signal level have for the purposes of simplicity been shown only in block form or eliminated. Also for the sake of simplicity, details of the necessary well-known types of driving rings and latches have been eliminated. Generally, a single latch comprises a double inverter and a cathode follower which responds when input signals raise the output of the cathode follower which in turn supplies the desired signal and has a feedback leading to the input to maintain the cathode follower conducting. A more detailed explanation is provided in the above Hamilton et al. application, and apparatus of this type is shown and claimed in the application of E. S. Hughes, Jr., Patent 2,628,309, which issued on February 10, 1953.

*General Description*

As shown in FIG. 1, a printer of the general type, such as described in the copending applications of F. M. Demer et al., Serial No. 704,938, entitled, "Improved Chain Printer," filed December 24, 1957, now U.S. Patent No. 2,990,767, and of E. R. Wooding, Serial No. 705,678, filed December 27, 1957, which issued as Patent No. 2,918,865 on December 29, 1959 entitled, "Chain Printer Timer," and also further described in the copending application of F. M. Demer et al., Serial No. 844,511 (IBM Docket 6243), entitled, "High Speed Printer Apparatus," filed October 5, 1959, now U.S. Patent No. 2,993,437, may comprise a movable chain 10 having a plurality of character bearing type members 12 thereon and rotatably supported by means, such as a shaft 14, to move past a plurality of print positions, each having a print hammer 16 actuated by a solenoid 18 for marking a paper (not shown) or the like inserted between the hammer and the chain. Information to be printed in the different print positions is stored in a core storage matrix 20 having seven core planes, one for each bit of a seven bit binary code, each plane comprising fourteen rows of cores with ten cores in each row. The information is written into different positions of the core storage 20 from a data input channel 22 under the control of a plurality of X switches 24 and Y switches 26 which selectively energize different ones of a plurality of X' lines and Y' lines passing through the cores to select different core positions in the planes under the control of B and A memory rings 28 and 30, respectively, in a manner well known in the art. A clock 32 and an oscillator 33 are utilized to effect stepping of the rings 28 and 30, the clock 32 controlling the B or units ring and the B ring controlling the A ring. The writing operation is completed by operating X and Y write drivers 34 and 35 in response to a W1 clock signal and a READ-IN signal. Inhibit latches 36 which are energized or set by a clock pulse R0 and are selectively reset in response to data input over the channel 22 selectively control inhibit lines 37 opposing the write lines to determine whether a core position is written when the X and the Y lines are energized.

Readout of information from the core storage 20 for printing is effected in a similar manner by successively scanning the different core positions under the control of the X and Y switches by energizing X'' and Y'' read lines passing through the cores in the opposite sense to the write lines X' and Y' through operation of the read X and Y drivers 38 and 40 in response to a clock signal R1 and a print scan signal. In order to determine which print position has a character opposite it or in print position corresponding to the character in storage, a compare counter 42 is utilized which is operated by a pulse scan counter 44 through control means 45 in response to pulses produced by a magnetic drum 46 which is driven in accordance with the shaft 14 for producing at all times an indication of the character on the chain 10 in a particular print position. The output of the compare counter is fed into a compare circuit 48 and compared in response to a print scan signal and clock signal W0 with the output from an input and regeneration circuit 50, so as to successively scan each print position as the rings 28 and 30 advance. Upon an equal comparison, a signal is fed through an AND circuit 52 with a clock pulse W1 to apply an equal signal to a hammer selecting matrix 54 over line 55 for enabling operation of the hammer actuating mechanisms 56 to fire the eligible hammer 16, under the control of the same X and Y switches which select the core storage position.

At the same time the signal from the compare 48 enables the firing of a hammer 16, this signal is also applied over line 58 to an equal check core plane 60 to reset the corresponding core to 0. When the particular hammer selected is fired, an impulse is directed over the line 62 to the corresponding core in a hammer fire check core plane 64 to set it to a 1. An error check scan is made on the next print scan cycle when the particular storage position is again interrogated, and the outputs of these two cores are fed through sense amplifiers 66 and latches 68 to a compare error circuit 70, so that if an equal condition exists, an error signal will be produced to turn on a compare error stop latch 72 and apply a signal over line 74 to set the corresponding core in a print error check core plane 76. A print line complete core check plane 80 is provided having cores which are set to 0 for each equal compare signal from the circuit 48 as the particular print position is scanned having been originally set to a 1 in response to energization of the X and Y lines upon writing the information into core storage 20. At the end of a complete line of printing, all the cores in the print line complete plane should be set to 0, and a check of this core plane will produce an error signal if this condition does not exist.

Figure 5:
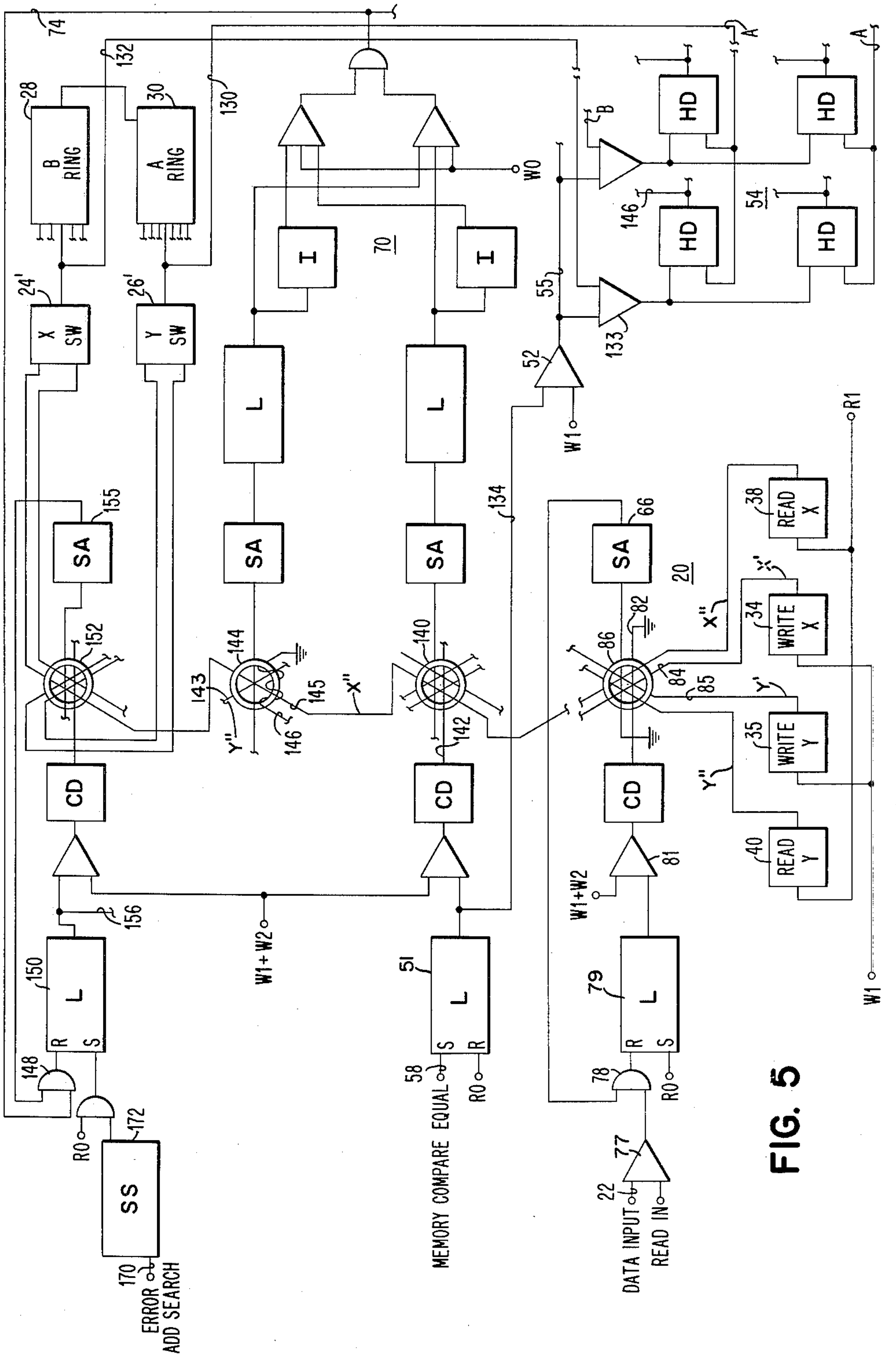
FIG. 5 is a schematic diagram of a further portion of the circuitry shown in FIG. 1 giving in further detail the print check error circuit, the hammer fire circuit, the equal check compare circuit, and the core storage circuit.

Referring to FIGS. 1 and 5, it will be seen that data is read into the core storage 20 over the input channel 22 with the bits of information for a typical one of the seven core planes gating in and AND circuit 77 in conjunction with a READ-IN signal and then through an OR switch 78 to an input and regeneration latch 79 for the particular core plane comprising a portion of the input and regeneration circuit 50 of FIG. 1. The latch 79 will be set by a clock pulse at R0, and the output sampled in AND switch 81 by clock pulses W1 and W2 for energizing the inhibit winding or line 82 to oppose the effect of the X and Y write drivers 34 and 35. Receipt of a data input signal over channel 22 resets the latch 79 so as to de-energize the inhibit line 82 and permit energization of the X' and Y' write lines to set the core 86. The write drivers 34 and 35 are turned by the clock pulse W2, the particular core 86 being selected by energization of its corresponding X and Y switches 24' and 26' in response to operation of the B and A rings 28 and 30. Each position of the core storage 20 is selected in sequence by the A and B rings in a similar manner, and information is written into the cores in response to corresponding bits over channel 22.

Figure 3:
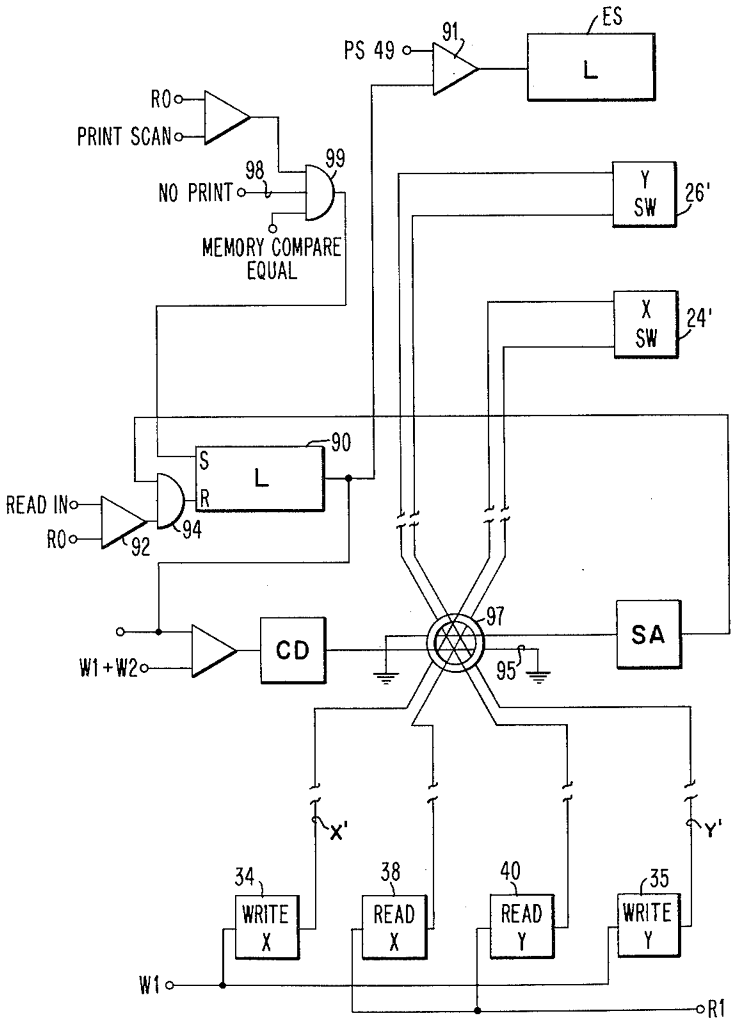
FIG. 3 is a schematic diagram of a portion of the circuit of FIG. 1 showing further details of the print line complete check circuitry.

Upon readin to the core storage memory 20, all positions of the print line complete check plane 76 will be set to the 1 state if there is a character to be printed in that position. This is accomplished, as shown in FIG. 3, by resetting a print line complete latch 90 in response to a READ-IN signal and the R0 clock pulse which gates and AND circuit 92 and resets the latch 90 through OR circuit 94. This in conjunction with W1 and W2 prevents energization of the inhibit line 95, so that energization of the X and Y write lines X' and Y' when the write drivers 34 and 35 are turned on and their respective switches 26' and 24' are selected by the B and A rings 28 and 30 to write information into storage sets the core 97 to a 1 for each position in which there is a character to be written. If there is an invalid character, a No-Print signal applied to the line 98 sets the print line complete latch 90 through OR circuit 99 and effects energization of the inhibit line 95 so as to prevent setting the core 97 to a 1 for the position in which there is no valid character.

Figure 2:
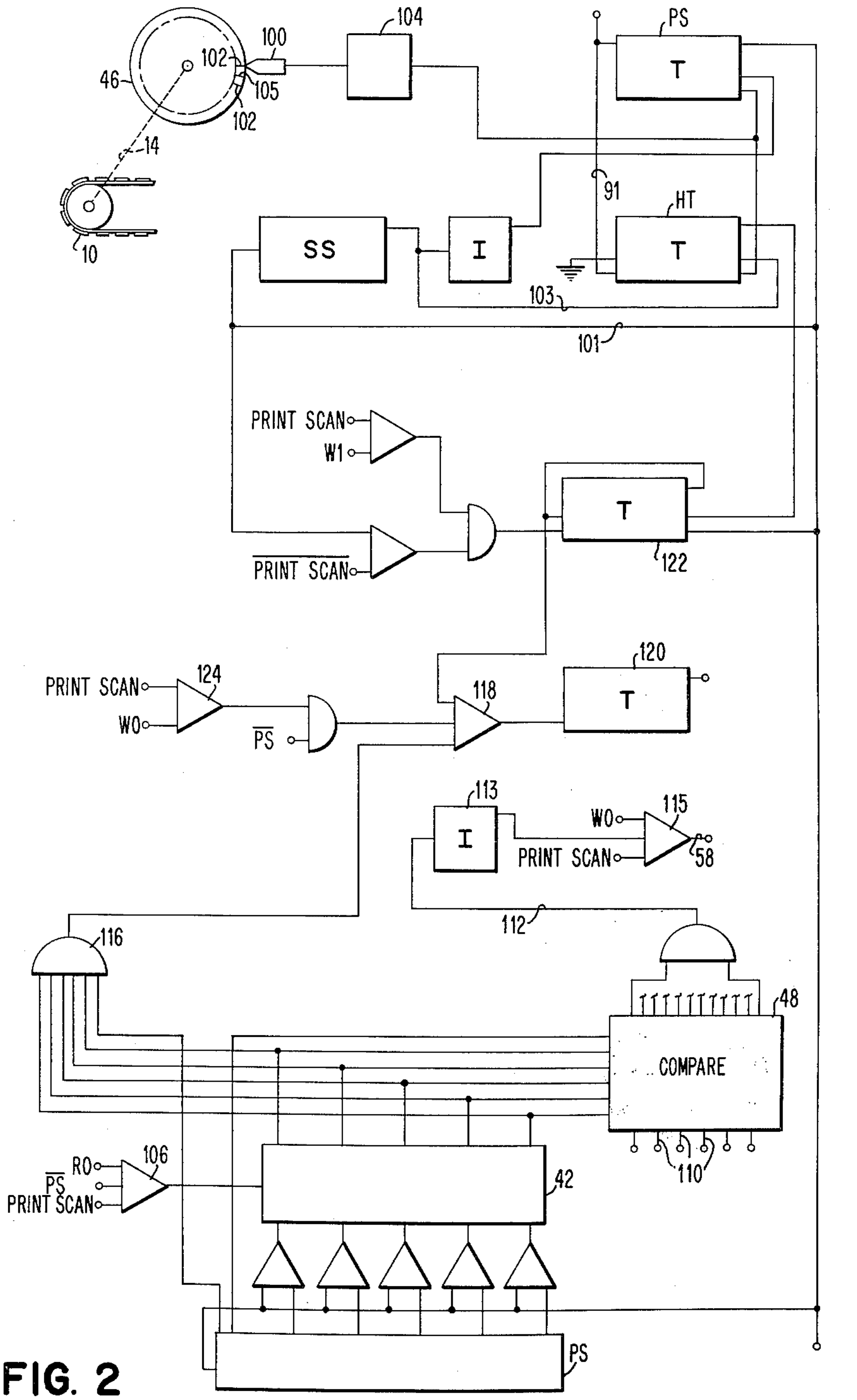
FIG. 2 is a schematic diagram of a portion of a system of FIG. 1 showing in further detail features of the error stop and the memory compare equal the circuit.

Referring to FIGS. 1 and 2, it will be seen that the magnetic drum 46 which is connected in driving relation with the shaft 14 which the chain 10 rotates has a read head 100 which cooperates with a plurality of slots 102 in the core to produce pulses which are amplified by an amplifier 104 and utilized to set a print scan trigger PS. In the present instant since 48 characters are used on the chain 12, 48 slots are utilized, one for each of the 48 scans made of each print position. The home position of the drum 46 is identified by an additional slot 105 halfway between the last slot and the first slot. The home position is thus identified by the combination of a pulse from the last or 49th slot and a delayed pulse from the 48th slot. The leading edge of the PS pulse is fed over line 101 to a single shot SS which produces a pulse longer than one half the time between PS pulses. The home trigger HT is gated by the single shot pulse over line 103. The PS pulse over line 91 goes to the set of the home trigger HT. On any of the PS pulses, the gate and set inputs of the home trigger HT rise simultaneously, but because the gate of the trigger has a slow rise time, it cannot be set by simultaneous inputs. The single shot pulse has ended by the next PS pulse except on the additional or 49th pulse which has a closer drum spacing. Thus on the 49th slot, a coincidence occurs, and the trigger HT is turned on and the home position is identified. The home pulse identifies the home or initial character on the chain; therefore, the character 1 is the home character when using a substantially binary code to identify the different characters.

The PS counter identifies the character aligned with the first print position by counting the pulses from the PS trigger. A compare counter 42 is utilized to indicate the character in the next eligible print position. This is accomplished by transferring on each PS pulse the character which is in the PS counter to the compare counter 42. The compare counter 42 is advanced by a clock pulse R0 in conjunction with a Print Scan signal and the absence of a signal from the PS trigger through an AND circuit 106.

The compare circuit 48 continuously compares the output of the content of the compare counter 42 with the character in storage for each print position in succession over the input and regeneration of lines 110 and when an equal condition is encountered, a 0 output on line 112 is inverted by the inverter 113 to produce in conjunction with a clock signal W0 and a Print Scan signal an output from a memory compare equal AND switch 115. When the character in the PS counter, as determined by the OR circuit 116, is anything other than 1 immediately after the home pulse, this indicates an error, and the output of the OR circuit 116 is utilized to control an AND switch 118 to turn on a home error latch 120 in conjunction with an output from a home pulse stored trigger 122 and an output signal from an AND circuit 124 in response to coincidence of a Print Scan signal and a W1 clock pulse signal.

Referring again to FIG. 5, it will be seen that the hammer select matrix 54 comprises a plurality of hammer drivers HD which are selectively switched by the A and B rings 30 and 28 over lines 130 and 132 in conjunction with a memory compare equal signal over line 55 which gates with the B ring output in AND switches 133. A memory compare equal latch 51 is set by a signal from the memory compare equal switch 115 over line 58 and is reset by clock pulse R0. Thus during a print scan operation whenever an equal condition is indicated between a character in storage and a character on the print chain 10 for a particular print position, this equal signal results in the energization or firing of corresponding print hammer driver HD.

Figure 4:
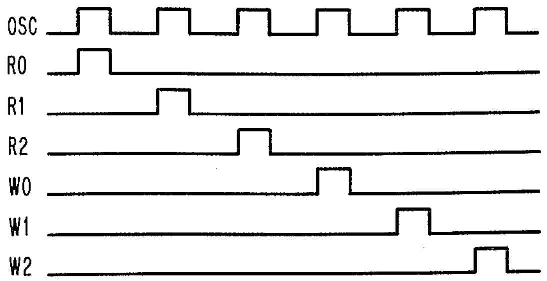
FIG. 4 is a timing chart illustrating the clock timing arrangement.

As shown in FIG. 4, during each cycle of clock pulses, the read or R pulses occur before the corresponding write or W pulses. Accordingly, during a print cycle, each of the cores 140 in the equal check plane 60, as shown in FIG. 5, is set to a 1 during the writing or W portion of the cycle, as in the read portion R0 of the clock cycle the latch 51 is reset, and the inhibit line 142 is ineffective to oppose the write lines. As described, the occurrence of a memory compare equal signal during the print scan operation results in a setting of the compare equal latch 51 and energizing the inhibit line 142 to set the core to 0 when the equal signal from switch 115 indicates that the corresponding print head hammer driver HD should be fired.

Each of the cores in the hammer fire check plane 64, such as the core 144, is initially set to 0 by the X and Y read lines X″ and Y″ during the R portion of the print cycle. Whenever a particular hammer driver HD is fired to operate its corresponding hammer, a signal is provided over conductor 146 to set the core 144 to a 1. Since the switch in core states occurs during the write portion of the clock cycle, this is after the cores have been read and compared. The conditions of the cores 140 and 144 for each print position are therefore compared in succession on the next print scan by a compare circuit 70 and since the cores should at all times be in opposite conditions, a compare signal results in an error, and this signal is applied over line 74 through OR circuit 148 to set a print error check latch 150 which results in setting the corresponding core 152 in the print check error plane 76.

In operation, information for each of the print positions is read into the core storage matrix 20 over the data input channel 22 under the control of the input and regeneration latches 79 which are reset by data input and which control the setting of the core 86 in response to energization of the read and write lines under the control of the X and Y write drivers 34 and 35 in response to selection of the particular cores through the X and Y switches 24′ and 26′ under the control of the B and A memory rings. As each bit is written into the core storage for the successive print positions, a corresponding core 97 in the print line complete core plane 80 is set. The equal check core plane cores 140 are initially set to 1, and the hammer fire check plane cores 144 are set to 0 as are the cores 152 of the print check error plane 76 during the W portion of the print cycle.

During print scan, the A and B rings successively select the different print position cores, the compare counter 42 is advanced by clock pulses, and the pulse scan signal successively presents the character on the print chain 10 opposite the print position being scanned. Thus the sequence of events, according to clock cycle, is as follows:

R0
1. Compare counter 42 is advanced to the correct character for the next eligible print position.
2. Memory rings A and B are advanced to select the particular X and Y switches 24′ and 26′ for the eligible print positions of storage and corresponding print hammer drivers.
3. Input and regeneration bit register latch 79 is set.

R1 X and Y read core drivers 38 and 40 interrogate the selected storage position.

R2

W0 Compare circuit 48 is sampled.

W1
1. Equal line for the compare circuit 48 is sampled with the W1 clock pulse at switch 52.
2. The character is rewritten in storage by the regeneration latch 79 being reset during the write portion of the clock cycle.

W2

Thus when the core postions are interrogated, the sense amplifier 66 transfers the character to the input and regeneration register latch 79, and it is available as a complement of the character. The compare counter 42 and the input and regeneration register latch 79 are compared, and on the clock cycle W0, this is sampled for an equal and if it is the memory compare equal latch 51 is set on. At W1 time, the memory compare equal latch 51 is sampled, and if a comparison exists, the hammer selected by the memory rings is fired in response to the equal signal over conductor 55.

On an initial readin to the core memory 20, all cores are set to a 1 on the tenth or print line complete plane 80 by the X and Y write lines if there is a character to be printed in that position. If an ineligible code or nonprinting position or dummy character is to be printed in any position, the core 97 corresponding to that position is set to a zero state in response to a no-print signal over line 98 which sets latch 90, as shown in FIG. 3. Each time a character is read out and printed, the corresponding core 97 in the print line complete plane 80 is reset to 0. If at the end of the 48 scan all the cores in this plane are not in a zero state, a check of this core plane is made in an extra or 49th print scan, and all positions of the print line complete plane should be at zero if all positions have been printed. The output of the print line complete latch 90 is sampled during this extra print scan with the 49th pulse from the print scan counter 44 at AND switch 91, and an output of this latch during this scan indicates an error and turns on a print error stop latch ES.

In the hammer firing check core plane 64, each core 144 is normally in a zero state, and when a hammer fires, a pulse over line 146 changes its core to a 1 state. The corresponding core 140 of the equal check core plane 60 is normally in a 1 state and is switched to 0 when a comparison between the stored character and a compare counter exists. Thus an equal or check plane core 140 is switched to a zero when the corresponding hammer driver HD is supposed to fire, and the hammer firing check plane core 144 is switched to a 1 when the hammer driver HD actually does fire. Therefore, if the cores in these two planes ever agree at any point in the memory cycle, it indicates an error, and this condition is checked in the next print scan after the cores are switched and the compare error stop latch 72 is turned on for an equal condition. At this time a core for the position is set to a 1 state in the print error check plane 76 by a pulse over line 74 to reset latch 150, for example, a core 152. When the operation is stopped by the compare error stop latch 72 being turned on, an error address search switch 160, shown in FIG. 1, may be operated to energize an error address search latch 164, which applies a simulated READ-IN signal over line 166 to the OR circuit 168 for effecting a simulated readin to cause operation of the clock 32 and the memory rings 28 and 30 in a manner similar to that described for readin. A signal is also applied over conductor 170 to a single shot 172, shown in FIG. 5, for setting the print error check latch 150. When the switches 24' and 26' select the set core 152 in the print error check plane, the output from the sense amplifier 155, when the set core is read, turns the print error check latch 150 on, and the output over line 156 is inverted by inverter 157 at AND switch 158 to stop the clock 32 and prevent advance of rings 28 and 30.

From the above description and the accompanying drawings, it will be seen that there is provided a simple and effective magnetic core plane check circuit for not only determining whether all the print positions are printed but which also continuously checks to determine whether a hammer has been fired in response to a comparison indication between the character in core storage and the character on the chain at the selected print position.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The combination in a printer having a plurality of print hammers with firing means and a chain bearing a plurality of characters movable past said hammers of core storage memory means for storing data to be printed in each of a plurality of positions corresponding to said hammers, means including a compare counter operable in accordance with the chain position for determining the character at a particular hammer position, means for comparing the character in core storage memory for the particular position with that in the compare counter, equal check storage means operated by the comparing means for storing an equal comparison indication for each such position, means for operating the hammer firing means of said particular position in response to an equal comparison, hammer fire check means controlled by said operating means for storing an indication of operation of the firing means for each hammer, and means for sequentially comparing the indications of corresponding equal check and hammer fire check means for each hammer.

2. In check means for a printer having a plurality of print hammers with firing means for actuating the hammers to print characters in a plurality of print positions from characters on a moving chain, print line complete checking means having means for indicating a character in each print position, counter means operable in accordance with the chain position for determining the character on the chain at a particular print position, memory core storage means for storing representations of characters to be printed in each of a plurality of positions, means including ring means for scanning the memory storage means and operating the checking means from a predetermined condition for each such position in which a character is to be printed, and means including compare means for checking for coincidence of characters in memory storage and in the counter means for each of the positions in sequence and producing a signal upon an equal condition to operate the firing means of each hammer and operate the corresponding position of the checking means for which a firing means is operated back to its predetermined condition and means for checking the checking means to determine whether all of the checking means are returned to their predetermined conditions.

3. In a printer having a plurality of print hammer positions with firing means for each hammer and data storage means with ring drive means operable to read data into and out of each position corresponding to a hammer position, said printer having an endless movable chain bearing a plurality of data representing characters for moving said characters past said hammers, an equal storage device and a hammer storage device for each position, means initially setting the equal device to one condition and the hammer device to another condition, means for comparing a character in a particular hammer position with the character in storage for said position and producing equal or unequal signals, and means responsive to an equal signal for each position to change the condition of and store an indication thereof in the equal storage means and operate the hammer firing means, means responsive to firing a hammer for each position for changing the condition of the hammer storage means, and means for comparing corresponding positions of the equal and hammer storage means.

4. The combination in a chain printer having a plurality of hammers, one for each print position, and a movable character bearing chain for moving the characters past said hammer positions, memory core device storage means, and means including a pair of rings for operating the storage means to enter data sequentially therein; of an additional print line complete storage means comprising a plurality of magnetic core devices selectively controlled by said rings to indicate a character entered into the memory storage for each position, means including a compare counter operable with the chain to indicate the character aligned with a particular hammer position, equal check means having a bistable element for each print position, means for setting said elements to one condition, means for comparing the character stored in each position with the character in the compare counter and producing a signal to fire the hammer for said position when the compare is equal, set the associated bistable equal check element to its other condition, and reset the additional print line complete core device storage means for each position printed, check means responsive to the firing of each hammer to store an indication of said firing, and means for simultaneously scanning the equal check means and hammer fire check means.

5. In a check system for a printer having a plurality of print hammers with operating means for actuating the hammers in a print cycle to print from characters on a moving chain, means including a scan counter synchronized with the chain operable to determine the character in a particular print position, memory storage means storing an indication of characters to be printed in each print position, means including ring drive means for scanning and selectively controlling reading from and writing in said memory means, print line complete storage means including a plurality of magnetic core devices sequentially scanned by the ring drive means for storing an indication of a character for each position of the memory storage means as said character is entered into said memory storage means, means for comparing the character in the scan counter in each print position with the character in the corresponding memory position, means responsive to an equal comparison for effecting operation of the print hammer operating means and resetting the core device of the corresponding position in the print line complete storage means to zero, and means responsive to other than a zero reading of the print line complete storage means at the end of a cycle means to indicate an error.

6. In checking apparatus for a printer having a plurality of print positions, each with a hammer having firing means for operating it to print a character from a moving chain bearing a plurality of characters, memory storage means for storing a representation of a character to be printed in each of the print positions, compare means for checking coincidence between each character representation in storage and the character on the chain opposite the hammer for said position and producing an equal signal, an equal core storage plane having a plurality of cores initially set in one direction and reset for storing an equal signal indication for each position for which coincidence is found, a hammer check core storage plane having a plurality of cores initially reset and set for storing an indication in response to firing of a hammer, means responsive to an equal signal for effecting operation of an associated hammer firing means for effecting a printing operation and storing an indication in the hammer check storage plane, and means comparing the hammer check and equal core storage on each print operation for detecting an equal error condition.

7. In checking apparatus for a printer having a plurality of print positions each with a hammer with means for actuating it to print characters from a moving element bearing a plurality of characters which are moved past all of said hammers in sequence, storage means for storing a representation of a character to be printed in each print position, means including compare means for detecting coincidence between a character in the storage means and a character on the moving element at a particular print position, equal check means rendered effective by said compare means for storing an indication of coincidence of a character in the storage means with a character on the moving element for each print position, and means responsive to a coincidence detection by the compare means for effecting operation of the actuating means, hammer fire check means individual to each hammer responsive to operation of the actuating means for storing an indication thereof, and means for comparing the operating conditions of the equal check means and the hammer fire check means for each hammer.

References Cited in the file of this patent

UNITED STATES PATENTS

| | | |
|---|---|---|
| 2,307,109 | Bryce | Jan. 5, 1943 |
| 2,692,551 | Potter | Oct. 26, 1954 |
| 2,702,380 | Brustman | Feb. 15, 1955 |
| 2,708,267 | Weidenhammer | May 10, 1955 |
| 2,776,618 | Hartley | Jan. 8, 1957 |
| 2,799,222 | Goldberg | July 16, 1957 |
| 2,831,424 | MacDonald | Apr. 22, 1958 |
| 2,904,781 | Katz | Sept. 15, 1959 |
| 2,918,865 | Wooding | Dec. 29, 1959 |